(12) United States Patent
Moon

(10) Patent No.: US 9,456,420 B2
(45) Date of Patent: Sep. 27, 2016

(54) APPARATUS AND METHOD FOR ADAPTIVE CHANNEL TRANSMISSION USING CHANNEL STATE

(75) Inventor: Hichan Moon, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 14/348,000

(22) PCT Filed: Aug. 29, 2012

(86) PCT No.: PCT/KR2012/006900
§ 371 (c)(1),
(2), (4) Date: Mar. 27, 2014

(87) PCT Pub. No.: WO2013/048018
PCT Pub. Date: Apr. 4, 2013

(65) Prior Publication Data
US 2014/0241171 A1    Aug. 28, 2014

(30) Foreign Application Priority Data
Sep. 27, 2011    (KR) .................. 10-2011-0097773

(51) Int. Cl.
*H04J 1/16*    (2006.01)
*H04W 52/02*    (2009.01)
*H04W 24/02*    (2009.01)
*H04L 25/03*    (2006.01)
*H04L 25/02*    (2006.01)

(52) U.S. Cl.
CPC ........ *H04W 52/0251* (2013.01); *H04L 25/023* (2013.01); *H04L 25/0398* (2013.01); *H04W 24/02* (2013.01)

(58) Field of Classification Search
None
See application file for complete search history.

(56) References Cited

U.S. PATENT DOCUMENTS

| 7,069,033 | B1 | 6/2006 | Moon et al. |
| 2005/0169295 | A1* | 8/2005 | Yun et al. ..................... 370/437 |
| 2006/0211378 | A1* | 9/2006 | Gaal et al. ..................... 455/69 |
| 2008/0085680 | A1 | 4/2008 | Kim et al. |
| 2011/0096686 | A1 | 4/2011 | Moon |

FOREIGN PATENT DOCUMENTS

| KR | 10-2006-0040014 A | 5/2006 |
| KR | 10-2008-0026012 A | 3/2008 |
| KR | 10-2011-0044155 A | 4/2011 |

OTHER PUBLICATIONS

International Search Report for PCT/KR2012/006900 filed on Aug. 29, 2012.
Hichan Moon et al., "Channel-Adaptive Random Access for TDD-Based Wireless Systems", IEEE Transactions on Vehicular Technology, Jul. 2011, pp. 2730-2741, vol. 60, No. 6, IEEE.

* cited by examiner

*Primary Examiner* — Chi H Pham
*Assistant Examiner* — Raul Rivas

(57) ABSTRACT

The present invention relates to an apparatus and method for adaptive channel transmission using a channel state, and according to one embodiment of the present invention, a method for channel transmission of a remote node includes intermittently receiving a forward channel transmitted from a host node, estimating a reverse channel state based on the received forward channel, determining whether the estimated reverse channel state satisfies a preset channel condition, and adaptively transmitting a reverse channel based on the determined result.

20 Claims, 7 Drawing Sheets

1 SUBFRAME (1ms)

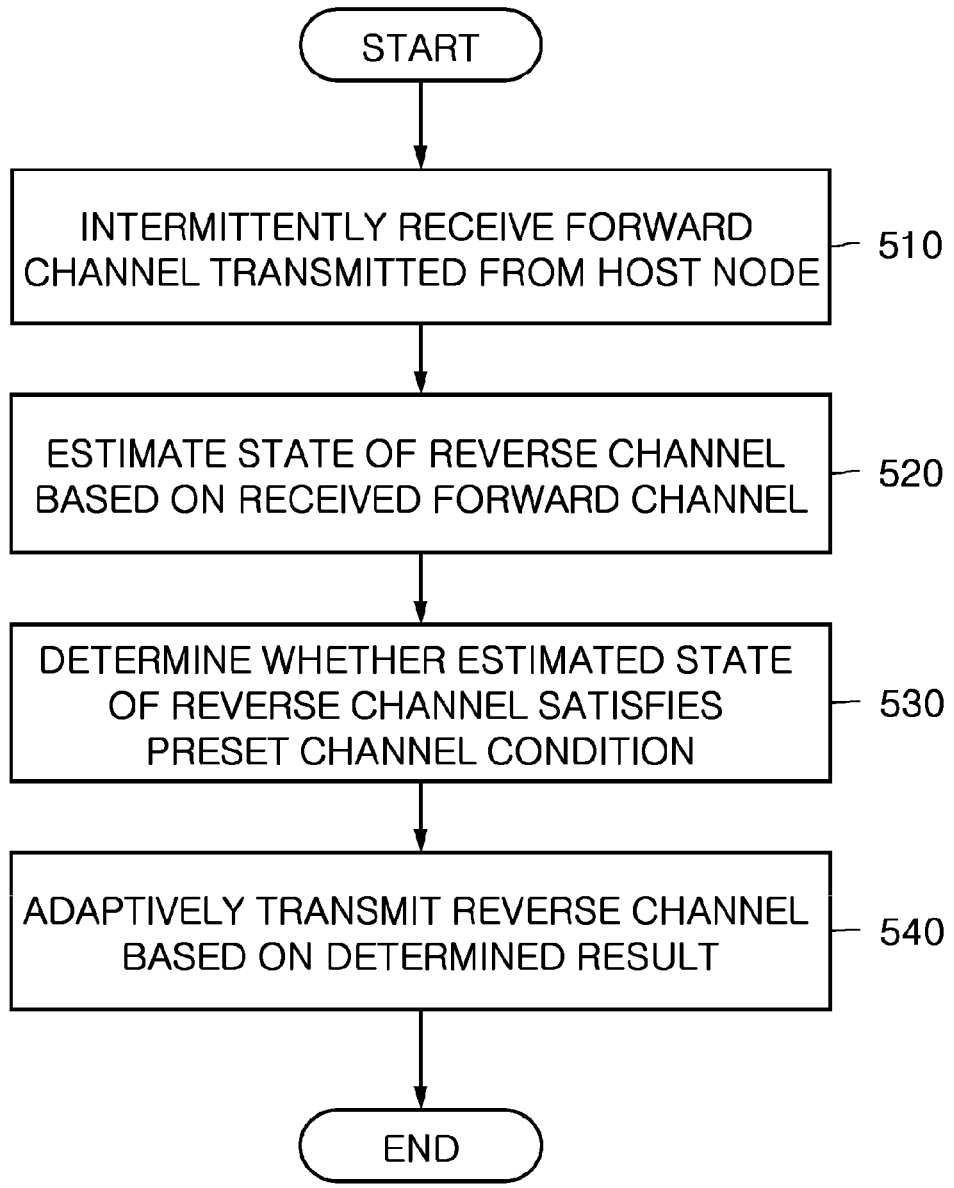

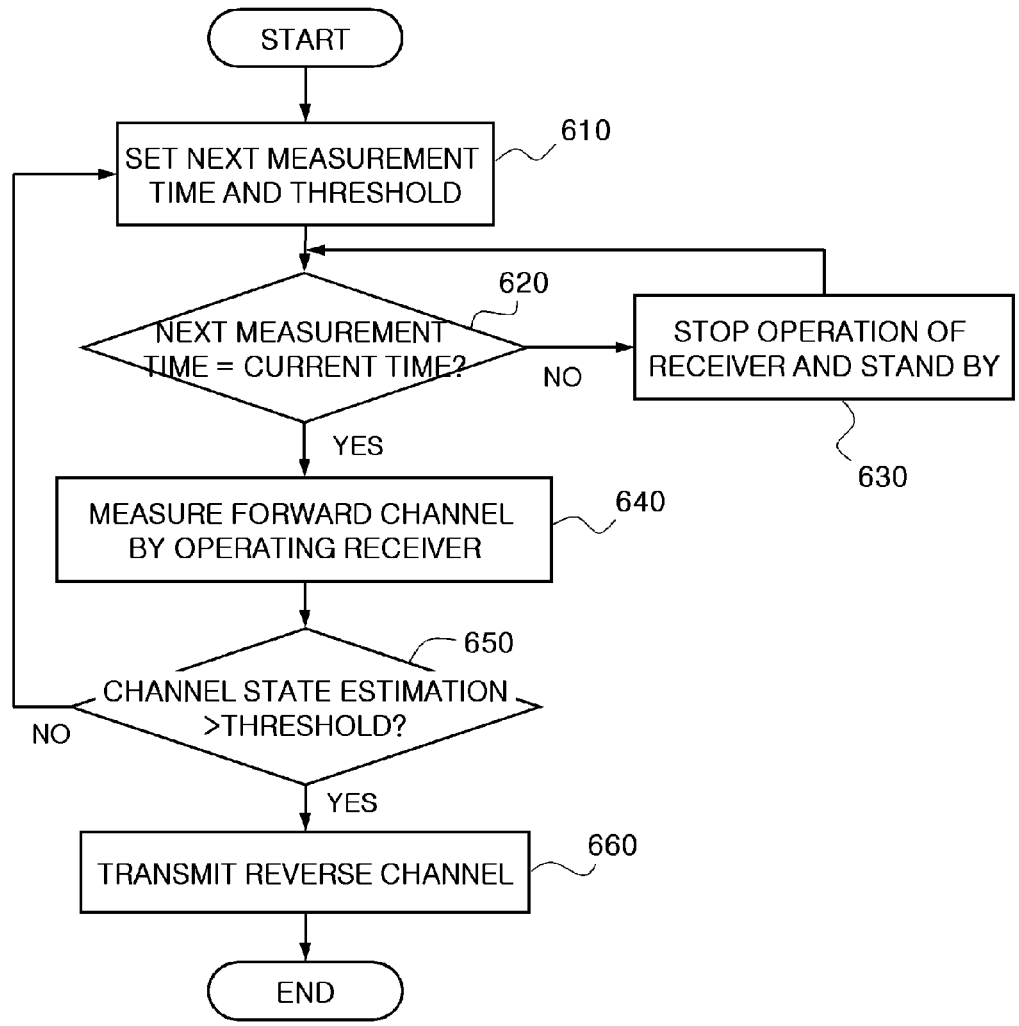

| PARAMETER ITEM | | VALUE |
|---|---|---|
| CHANNEL ADAPTIVE RANDOM ACCESS CHANNEL THRESHOLD VALUE | | 0.1 |
| MINIMUM MEASUREMENT FREQUENCY | | 20 Hz |
| MEASUREMENT FREQUENCY OF DOPPLER FREQUENCY RANGE 1 (0~10.0 Hz) | QoS 1 | 30 Hz |
| | QoS 2 | 50 Hz |
| MEASUREMENT FREQUENCY OF DOPPLER FREQUENCY RANGE 2 (10.0 Hz OR HIGHER) | QoS 1 | 80 Hz |
| | QoS 2 | 100 Hz |

APPARATUS AND METHOD FOR ADAPTIVE CHANNEL TRANSMISSION USING CHANNEL STATE

TECHNICAL FIELD

The present invention relates to an apparatus and method for channel transmission, and more particularly, to an apparatus and method for channel transmission, in communication between a host node and a remote node, that adaptively transmits a reverse channel from the remote node to the host node in consideration of a state of a communication channel, and a recording medium recording the method.

BACKGROUND ART

The development of electronic technologies has promoted the development of telecommunication using an electromagnetic wave as a medium, and telecommunication has expanded and is being used as various types of wireless communications of the day. Basically, wireless communication modulates information to be transmitted to a radio wave and transmits the radio wave through a power amplifier (PA), so that the received radio wave is demodulated at the side of a receiver to obtain the information.

To improve the efficiency of wireless communication, researchers introduced a concept of time division that configures different message channels for each time slot in a non-overlapping manner of the message channels by temporally separating the respective messages, to allow parallel transmission over a single transmission medium. Using this time division, a pulse of one communication path can be inserted using a rest period between pulses on another communication path, thereby allowing temporally different multiple communications. Particularly, in the time division transmission scheme, a scheme that enables bidirectional communications using one frequency by dividing one frame into a transmission part and a reception part is referred to as time division duplex (TDD). Generally, wireless communication uses different frequencies for transmission and reception, while a TDD scheme is characterized in that a single frequency is temporally divided for separate use of transmission and reception, thereby allowing bidirectional communications.

Meanwhile, a TDD-based wireless communication system and a remote node (or a wireless communication terminal) for use therein receive a signal from a host node and transmit its own signal to the host node. With the functional diversity and structural complexity of the remote node, in turn, a difficulty in power management occurred to the remote node. Particularly, with the advanced function of the remote node, various studies have been proposed to save the power consumed by the remote node making a mutual communication with the host node. The non-patent literature as stated below indicates a situation in which excessive power is consumed in reverse channel transmission from a remote node to a host node.

(Non-patent Literature 1) Hichan Moon, Suhan Choi, "Channel adaptive random access for TDD-based wireless systems", IEEE Trans. Vehicular Tech., pp. 2730-2741, July 2011.

DISCLOSURE

Technical Problem

The present invention is designed to solve a problem that efficiency of channel transmission reduces due to a remote node in a wireless communication system transmitting a reverse channel upon receiving a forward channel from a host node without considering a channel state, to prevent unnecessary power consumption by leaving power consumed in measuring the forward channel received from the host node out of consideration, and to overcome the limitation of transmission performance caused by the reverse channel transmission of the remote node without considering a change in the channel state.

Technical Solution

To solve the technical problem, a method for channel transmission of a remote node according to one embodiment of the present disclosure includes intermittently receiving a forward channel transmitted from a host node, estimating a state of a reverse channel from the remote node to the host node based on the received forward channel, determining whether the estimated state of the reverse channel satisfies a preset channel condition, and adaptively transmitting the reverse channel based on the determined result.

In the method for channel transmission of the remote node according to one embodiment, the receiving of the forward channel is performed by measuring the forward channel by the remote node enabling an operation of a receiver for only a first period, and not measuring the forward channel by stopping the operation of the receiver for a second period apart from the first period, and the first period during which the receiver operates and the second period during which the receiver does not operate are arranged repetitively in a flow of time. Also, in the method for channel transmission of the remote node according to one embodiment, it is possible to set different time interval values between the plurality of first periods arranged repetitively.

In the method for channel transmission of the remote node according to one embodiment, the receiving of the forward channel includes setting a next measurement time, comparing the set next measurement time to a present time, and when the next measurement time corresponds to the present time as a result of the comparison, measuring the forward channel by the remote node enabling an operation of a receiver. On the contrary, when the next measurement time does not correspond to the present time, the remote node repeats the comparison step after stopping an operation of a receiver and standing by for a predetermined time.

To solve the technical problem, a method for channel transmission of a remote node according to another embodiment of the present invention includes receiving a forward channel transmitted from a host node, estimating a state of a reverse channel from the remote node to the host node based on the received forward channel, determining whether the estimated state of the reverse channel satisfies a preset channel condition, and adaptively transmitting the reverse channel based on the determined result, and the channel condition is variably reset over time.

Also, in the method for channel transmission of the remote node according to another embodiment, the determining of whether the estimated state of the reverse channel satisfies the preset channel condition is performed by comparing a state estimate of the reverse channel calculated based on a channel gain of the received forward channel to a threshold representing the channel condition.

Further, hereinafter, there is provided a computer-readable recording medium having a program for causing a computer to execute the above methods for channel transmission of the remote node stored therein.

To solve the technical problem, a remote node according to still another embodiment of the present invention includes a receiving unit to intermittently receive a forward channel transmitted from a host node, a channel estimating unit to estimate a state of a reverse channel from the remote node to the host node based on the received forward channel, a control unit to determine whether the estimated state of the reverse channel satisfies a preset channel condition and determine whether to transmit the reverse channel based on the determined result, and a transmitting unit to adaptively transmit the reverse channel based on the determination of the control unit.

In the remote node according to still another embodiment, the receiving unit measures the forward channel by operating for only a first period and does not measure the forward channel turning off the receiver for a second period apart from the first period, and the first period during which the receiver operates and the second period during which the receiver does not operate are arranged repetitively in a flow of time. Also, in the remote node according to still another embodiment, it is possible to set different time interval values between the plurality of first periods arranged repetitively.

In the remote node according to still another embodiment, the channel condition may be variably reset over time.

In the remote node according to still another embodiment, the control unit determines whether to transmit the reverse channel by comparing a state estimate of the reverse channel calculated based on a channel gain of the received forward channel to a threshold representing the channel condition.

Advantageous Effects

The embodiments of the present invention may improve the efficiency of channel transmission by enabling a remote node to transmit a reverse channel with a delay in consideration of a channel state rather than making a response immediately upon receiving a forward channel from a host node, may reduce unnecessary power consumption involving channel reception by intermittently measuring the forward channel received from the host node, and may optimize the performance of reverse channel transmission by variably setting a channel condition in consideration of a change in the channel state.

DESCRIPTION OF DRAWINGS

FIG. 5 is a flowchart illustrating a method for channel transmission of a remote node according to an exemplary embodiment of the present invention.

FIG. 6 is a flowchart illustrating more specifically a method of controlling intermittent reception of a forward channel and transmission of a reverse channel based on a channel condition in the method of FIG. 5 according to an exemplary embodiment of the present invention.

DETAILED DESCRIPTION OF MAIN ELEMENTS

Figure 1:
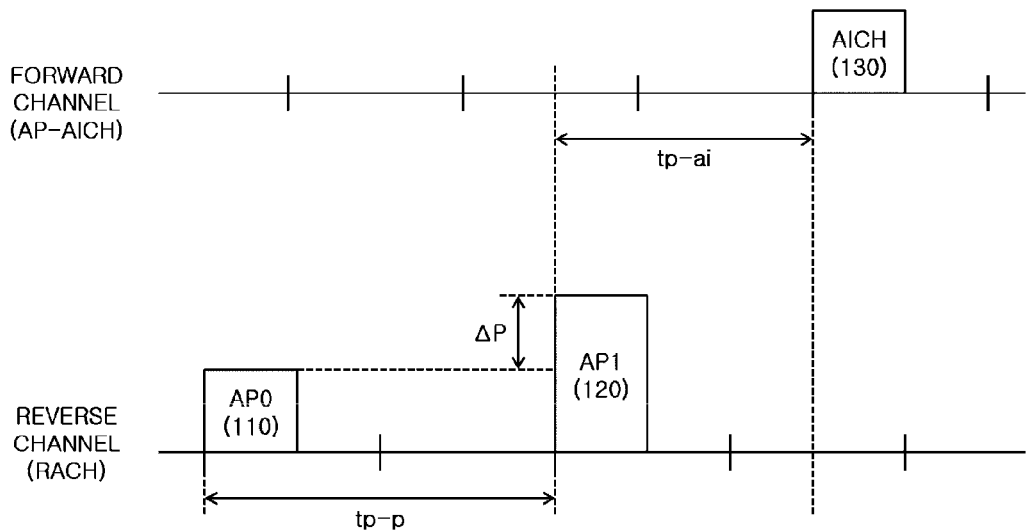
FIG. 1 is a diagram illustrating a signal transmission structure of a forward channel and a reverse channel under a wireless communication environment in which the embodiments of the present invention are implemented.

900: Remote node
10: Antenna
20: Receiving unit
30: transmitting unit
40: Channel estimating unit
50: Control unit
60: Doppler frequency measuring unit

[Best Mode]

According to one embodiment of the present invention, a method for channel transmission of a remote node includes intermittently receiving a forward channel transmitted from a host node, estimating a state of a reverse channel from the remote node to the host node based on the received forward channel, determining whether the estimated state of the reverse channel satisfies a preset channel condition, and adaptively transmitting the reverse channel based on the determined result.

According to another embodiment of the present invention, a method for channel transmission of a remote node includes receiving a forward channel transmitted from a host node, estimating a state of a reverse channel from the remote node to the host node based on the received forward channel, determining whether the estimated state of the reverse channel satisfies a preset channel condition, and adaptively transmitting the reverse channel based on the determined result, and the channel condition is variably reset over time.

[Mode for Invention]

Prior to the description of the embodiments of the present invention, a wireless communication environment in which the embodiments of the present invention are implemented, and an implementation problem occurring in the environment in which the embodiments of the present invention are implemented and a solution to the problem will be now presented briefly.

The embodiments of the present invention are widely applicable to a wireless communication system using time division duplex (TDD). Hereinafter, the term 'host node' will be used to represent a node transmitting a signal through a forward link, and the term 'remote node' will be used to represent a node transmitting a signal through a reverse link. Take note of a random access channel used in a mobile communication system that is a type of wireless communication system, for example, Wideband Code Division Multiple Access (W-CDMA) or Long Term Evolution (LTE) by the Third Generation Partnership Project (3GPP) or CDMA2000 by 3GPP2. First, assuming a W-CDMA system, a description of random access channel transmission is provided with reference to FIG. 1.

FIG. 1 is a diagram illustrating a signal transmission structure of a forward channel and a reverse channel under a wireless communication environment in which the embodiments of the present invention are implemented, and a remote node transmits a signal through a random access channel (representing a reverse channel) as shown in FIG. 1.

In FIG. 1, assume that a forward channel is an access preamble-acquisition indication channel (AP-AICH), and a reverse channel is a random access channel (RACH). As shown in the drawing, the remote node transmits a preamble through a random access channel of a reverse link for initial synchronization of communication. In this instance, the remote node transmits an access probe (AP) AP0 110 including a preamble through the random access channel. For example, the remote node transmits an access probe consisting of a preamble as shown in (A) of FIG. 2 through the random access channel.

In case the remote node does not receive a response signal to the access probe AP0 110 from the host node for a time period of tp-p, the remote node re-transmits, through the random access channel, an AP1 120 with an increased transmission power by ΔP in comparison to the access probe AP0 110. In this instance, the access probe AP1 120 includes a preamble consisting of a same signature as the access probe AP0 110 transmitted previously.

Then, when the host node receives the access probe AP1 120 through the random access channel, the host node stands by for a time period of tp-ai and transmits a same signature as the received access probe AP1 120 to the remote node through an AICH 130. Then, the remote node identifies the signature and an acquisition indicator (AI) (not shown) by demodulating a signal received through the AICH 130. In case an acknowledgement (ACK) signal of the host node is identified through the acquisition indicator, the remote node stands for the time period of tp-ai again and transmits a message including reverse data to the host node through the reverse random access channel. For example, the remote node transmits an access probe including a message configured as shown in (B) of FIG. 2 through the random access channel. In this instance, the remote node transmits the corresponding access probe with a transmission power corresponding to the access probe AP1 120.

Figure 2:
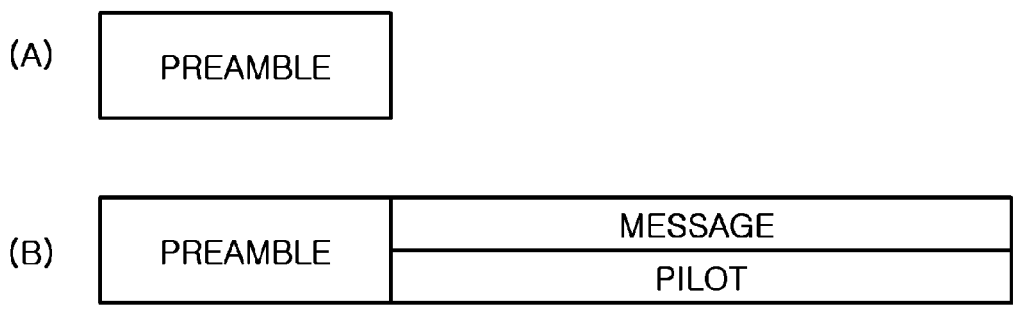
FIG. 2 is a diagram illustrating a structure of an access probe (AP) transmitted through the reverse channel in the wireless communication environment of FIG. 1.

FIG. 2 is a diagram illustrating a structure of the access probe (AP) transmitted through the reverse channel in the wireless communication environment of FIG. 1, and assuming CDMA2000 by 3GPP2. In case an access probe including a message shown in (B) of FIG. 2 is transmitted from the remote node and is successively received by the host node, the 3GPP2 CDMA2000 random access channel provides a reception notification to the remote node through a forward common channel. That is, this signal is transmitted as a message via the forward common channel without AICH transmission.

As described in the foregoing, a majority of random access channels is an essential element of a wireless communication system, and a random access channel is implemented through various methods. Despite various implementation methods, a conventional random access channel merely has transmitted an access probe immediately upon occurrence of an event that aims to transmit a random access channel on an upper layer, without considering a channel state of a reverse link. However, this prompt random access channel transmission has a problem that excessive transmission power is required.

To solve this problem, a sort of transmission delay method may be proposed in which a time division duplex-based wireless communication system obtains information of a reverse channel state by measuring a state of a forward channel, and transmits a random access channel only when the obtained information satisfies a particular transmission condition. By determining whether to transmit the random access channel based on the channel state and delaying the transmission of the random access channel access probe when the transmission condition is not satisfied, a transmission output may be significantly reduced. Also, a coverage radius of the communication system may be greatly expanded under the same maximum or average transmission output condition.

In sum, the above-mentioned channel adaptive random access channel transmission scheme enabled a remote node to determine a random access channel transmission condition in advance, to measure a forward channel, and when the forward channel satisfies a transmission condition, to transmit a random access channel, and otherwise, to delay the random access channel transmission. That is, a transmission power used in transmission may be significantly reduced by transmitting a random access channel only when a channel state is good.

However, power consumed by the remote node is not only a transmission power of the random access channel, but also a great amount of power required to operate a receiver to measure the forward channel. In the simple channel adaptive random access channel discussed in the foregoing, power consumed in measuring the forward channel was not considered.

Meanwhile, in the conventional channel adaptive random access channel, once a transmission condition is determined, optimizing the transmission condition by changing the transmission condition was not contemplated. Accordingly, it was impossible to flexibly respond to a change in channel state. In relation to this, in many wireless communication systems, there may exist a required condition that a message of a random access channel should be transmitted within a predetermined time. Under this situation, in case transmission of a random access probe is delayed due to a bad channel state, performance of a channel adaptive random access channel may be further improved by changing a transmission condition based on an elapsed time (or a time left for subsequent random access channel transmission).

Figure 3A:
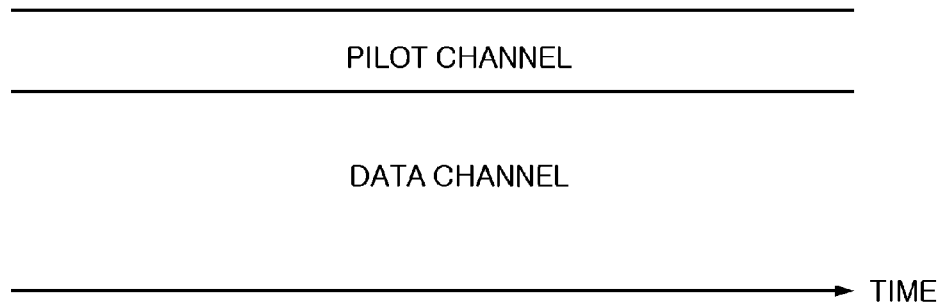
FIGS. 3a and 3b are diagrams each illustrating a pilot channel transmitted under a wireless communication environment in which the embodiments of the present invention are implemented and a reference signal transmitted in a forward direction.
Figure 3B:
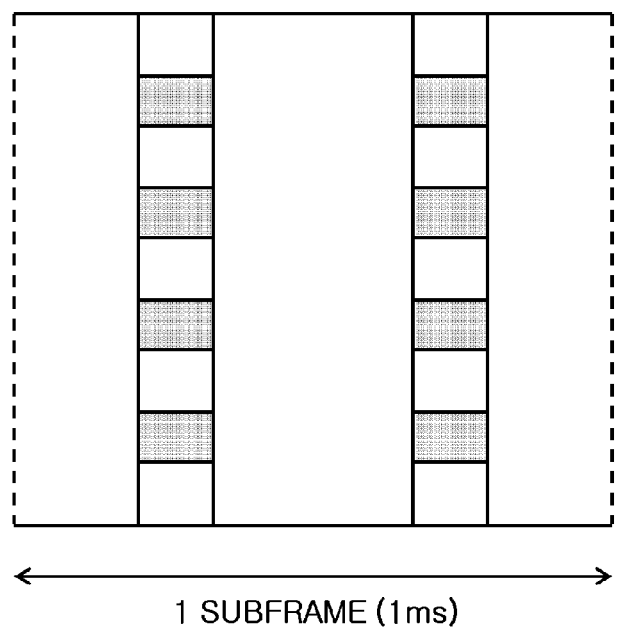

FIGS. 3a and 3b are diagrams each illustrating a pilot channel transmitted under a wireless communication environment in which the embodiments of the present invention are implemented and a reference signal transmitted in a forward direction. Generally, in many wireless communication systems, a host node transmits a pilot or a reference signal continuously or periodically via a forward link. Under this wireless communication environment, according to the embodiments of the present invention, a remote node measures a forward channel transmitted by the host node and estimates a reverse channel state based on the measured result.

FIG. 3a illustrates a pilot channel transmitted in CDMA2000 or W-CDMA. Referring to FIG. 3a, in case a pilot channel exists as one code channel, the pilot channel is always transmitted continuously. Accordingly, a remote node may measure a state of a forward channel by measuring the pilot channel. As described previously, when transmitting a random access channel, a conventional CDMA2000 or W-CDMA system transmitted a random access channel immediately upon occurrence of an event of triggering the random access channel on an upper layer. In this instance, to determine a transmission power for transmitting the random access channel, a state of a forward channel was measured. That is, the pilot channel being transmitted via the forward channel was continuously measured and used to determine the transmission power of the random access channel.

Accordingly, it can be seen that power consumption by the remote node receiving the forward channel may take place in the process of transmitting the reverse channel (random access channel).

FIG. 3b illustrates an implementation example of a reference signal transmitted in a forward direction in 3GPP LTE. In FIG. 3b, one subframe is transmitted with a length of 1 millisecond (ms), and each subframe is made up of 14 orthogonal frequency-division multiplexing (OFDM) symbols. The reference signal is transmitted for only a period of a certain symbol among the symbols. In the LTE system, the reference signal is transmitted in every 1st, 5th, 8th, and 12th OFDM symbols, and using this, a state of a forward channel may be measured. However, in case transmission of a random access channel is needed, a remote node continuously monitors a forward channel. For the convenience of description, FIG. 3b illustrates a reference signal under the assumption that the reference signal is transmitted in only two symbols of a subframe. That is, although FIG. 3b shows one subframe, this subframe structure has a structure of repeating unlimitedly on a time axis. Thus, a remote node can measure a channel state of a forward channel in all the subframes.

Now, assume that an event of an upper layer occurs under the above wireless communication environment. In the conventional random access channel transmission scheme, a random access channel was transmitted immediately when an event of an upper layer occurred. On the contrary, in a channel adaptive random access channel employed in the embodiments of the present invention, an access probe of a random access channel is transmitted only when a preset channel condition is satisfied, and otherwise, access probe transmission is delayed.

In case a random access channel is to be transmitted via only a channel in a very good state to minimize a transmission power, it may take a very long time before transmitting an access probe. In this case, in terms of overall power consumption of a terminal, power required to measure a forward channel may be relatively greater than a transmission power. Particularly, in the case of channel adaptive random access channel transmission, a transmission delay of an access probe may range from several ms up to several seconds due to its operational characteristics. Even in this case, if a remote node continuously measures a state of a forward channel by operating a receiver, there is a concern that power consumption of the remote node receiver will function as a main factor of overall power consumption.

For example, assume that power consumption by a remote node transmitting a random access channel is 500 milliwatt (mW), and the remote node transmits the random access channel for total 5 ms, including a message. In this case, energy consumed by a transmitter is $2.5 \times 10^{-3}$ J in total. On the contrary, in case power is 50 mW when only a receiver operates and a transmission delay in channel adaptive random access channel transmission is 1 second, power consumed by a receiver is $50 \times 10^{-3}$ J in total, so that a situation occurs in which the power consumed by the receiver is greater about 20 times than the transmission power.

To solve the above problems, hereinafter, various embodiments of the present invention are described in detail with reference to the accompanying drawings. In the description of the invention, a detailed description of related known functions or structures is omitted if it is deemed to obscure the subject matter of the present invention. The embodiments of the present invention may be used to reduce a transmission power required for a reverse random access channel or to expand a coverage radius of a terminal having a limited maximum transmission output or average transmission output in the field of mobile communication. Also, the embodiments of the present invention may be used in all types of communication systems and terminals needed to minimize the power required for communications, for example, a sensor network, a wireless local area network (LAN), machine-to-machine communication, and communication between medical equipments.

Figure 4A:
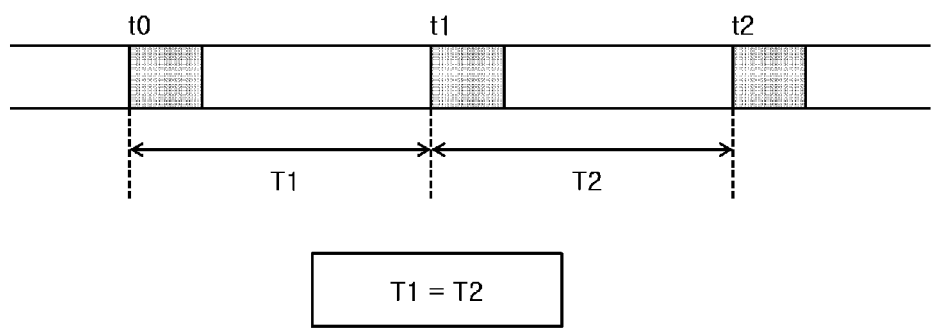
FIGS. 4a and 4b are diagrams illustrating methods of intermittently receiving a forward channel employed by the embodiments of the present invention.
Figure 4B:
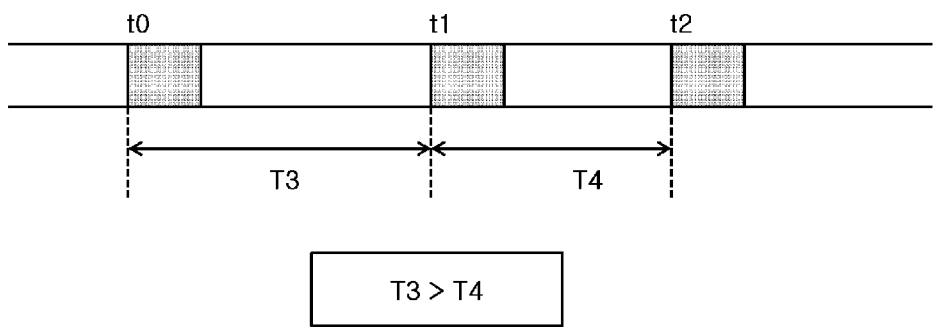

FIGS. 4a and 4b are diagrams illustrating methods of intermittently receiving a forward channel employed by the embodiments of the present invention, and demonstrates an operation of a receiver equipped in a remote node.

Basically, the embodiments of the present invention estimate a state of a reverse channel through receiving and measuring a forward channel, and transmit a reverse channel in consideration of a set channel state. However, in this case, there exists a concern about a waste of power caused by power consumed while receiving a forward channel based on a channel state as indicated previously. To solve this problem, the present invention proposes a method that reduces overall power consumption of a remote node by repeating a process of enabling operation of a receiver for a predetermined period and a process of enabling non-operation of the receiver for a predetermined period, rather than measuring a state of a forward channel by continuously operating a receiver of a terminal.

First, in case there is a need to transmit a random access channel, a remote node measures a forward channel and determines whether to transmit the forward channel. The remote node performs a forward channel measurement for a certain time period, and determines whether to transmit an access probe based on the measured result. Also, the remote node does not operate a receiver of the remote node for a time during which the forward channel measurement is not performed, so that power consumption of the remote node may be reduced. Particularly, power consumption may be minimized by powering off a majority of blocks for a time period during which the remote node does not measure the forward channel, except an essential part for operation of the remote node, for example, a clock to measure a time of the remote node. That is, the remote node may reduce power consumption by operating similar to a sleep state of a mobile communication terminal.

In FIG. 4a, a remote node measuring a state of a forward channel in a uniform cycle is shown for each period. In FIG. 4a, a measurement interval was set to maintain a uniform time interval (T1=T2) all over the measurement intervals. A point in time at which the remote node operates the receiver to measure the state of the forward channel may be determined by various methods. First, assume that the remote node measures a Doppler frequency of the channel by embedding a Doppler frequency measurer in the receiver or is already aware of an estimated value of a Doppler frequency of the channel between the remote node and the host node. In this case, the remote node may determine a measurement cycle of the state of the forward channel as a function of the Doppler frequency of the channel. The embodiments of the present invention may adjust an interval of the forward channel measurement period shown in FIG. 4a according to the determined measurement cycle. This time interval may be determined in inverse proportion to the Doppler frequency. That is, when the Doppler frequency of the channel is high, the time interval between measurement periods of the state of the forward channel is set to be short, and when the Doppler frequency of the channel is low, the time interval between measurement periods of the state of the forward channel is set to be long.

Also, the time interval between measurement periods may be adjusted based on another parameter. For example, the time interval between measurement periods of the forward channel may be adjusted in proportion to a time allowed to transmit a random access channel. That is, when the allowed transmission time is long, there is no need to perform a forward channel measurement in a high-frequency. Therefore, when the allowed transmission time is long, the time interval between measurement periods is set to be long, and when the allowed transmission time is short, the time interval between measurement periods is set to be short, and in the end, power consumption in a remote station may be optimized.

As a method of setting the time interval between measurement periods, an initially set time interval may be fixedly used until an access probe is transmitted. However, more efficient random access channel transmission may be achieved by varying the time interval over time. That is, the time interval between measurement periods may be variably set based on an elapsed time from the time of occurrence of an event that aims to initially transmit a random access channel or a left time allowed to finally transmit a random access channel. When the elapsed time from the time of occurrence of the initial transmission event is long or the allowed left time is shortened, the time interval between measurement periods may be set to be short, thereby designing to increase a number of measurements.

FIG. 4b illustrates an example of variably setting the time interval between measurement periods over time. Referring to FIG. 4b, the remote node performs a forward channel measurement from a point in time t0 at which initial random access channel transmission is determined. However, because a channel state at this time does not satisfy a transmission condition, a terminal stops the operation of the receiver until a point in time t1, and performs a forward channel measurement again from the point in time t1. In this instance, a time interval between t0 and t1 is T3. The remote node performs a forward channel measurement at the point in time t1. In case a channel state at this time still does not satisfy the transmission condition, the operation of the receiver is paused for a predetermined period and the forward channel measurement is performed again at a point in time t2. In this instance, a time interval between t1 and t2 is T4. As illustrated in FIG. 4b, it can be seen that T4 is shorter than T3. Accordingly, overall power consumption of the remote node may be optimized by varying the time interval between measurement periods over time. Particularly, overall performance may be improved by setting the time interval between measurement periods to be short over time as illustrated in the embodiment of FIG. 4b.

In case a pilot is not continuously transmitted on a time axis as shown in FIG. 3b, it is construed that certain subframes or pilots on the time axis are used to measure the channel state of the forward channel and the other subframes or pilots are not used to measure the channel state of the forward channel. Therefore, even when a pilot is intermittently transmitted as shown in FIG. 3b, the remote node uses only some pilots in the forward channel measurement while disregarding the other pilots, rather than using all the pilots in the forward channel measurement.

Meanwhile, the time interval may be changed in a way of increasing the corresponding time interval as well as reducing the time interval as shown through the embodiment of FIG. 4b. For example, the time interval between forward channel measurement periods may be adjusted to a wider interval under various situations, such as a case in which the receivers senses a change in the Doppler frequency of the channel after starting the random access channel transmission, a case in which a QoS of a message desired to be transmitted changes, or a case in which a change in condition of the time allowed to transmit a random access channel occurs.

As described in the foregoing, in case the forward channel measurement of the remote node operates intermittently, it is possible to optimize power consumption of the system by varying the time interval.

FIG. 5 is a flowchart illustrating a method for channel transmission of a remote node according to an exemplary embodiment of the present invention, and the method includes the following steps.

In step 510, the remote node intermittently receives a forward channel transmitted from a host node. For intermittent reception, the remote node measures the forward channel by enabling operation of a receiver for only a first period, and does not measure the forward channel by stopping the operation of the receiver for a second period apart from the first period. In this instance, the first period during which the receiver operates and the second period during which the receiver does not operate may be arranged repetitively in the flow of time.

Also, the time interval between the plurality of first periods arranged repetitively (that is, a receiving cycle of the forward channel) may be variably set based on at least one of a Doppler frequency of the received forward channel, a time allowed to transmit a reverse channel, an elapsed time from the time of occurrence of an event that aims to transmit a reverse channel, or a required level of a set QoS, and a request from a host. More specifically, the receiving cycle of the forward channel may be in inverse proportion to the Doppler frequency of the received forward channel, may be in proportion to the time allowed to transmit the reverse channel, may be in inverse proportion to the time of occurrence of the event that aims to transmit the reverse channel, and may be in inverse proportion to the required level of the set QoS.

In step 520, the remote node estimates a state of a reverse channel from the remote node to the host node based on the forward channel received through step 510.

In step 530, the remote node determines whether the state of the forward channel estimated through step 520 satisfies a preset channel condition, and in step 540, transmits a reverse channel adaptively based on the determined result. In this instance, a transmission power for transmitting the reverse channel may be determined by estimating the state of the reverse channel through measuring a pilot channel included in the forward channel transmitted through step 510.

FIG. 6 is a flowchart illustrating more specifically a method of controlling the intermittent reception of the forward channel and the transmission of the reverse channel based on the channel condition in the method of FIG. 5 according to an exemplary embodiment of the present invention.

In step 610, the remote node sets a next measurement time at which the remote node intends to receive the forward channel and a threshold representing the channel condition for access probe transmission. In the case of channel adaptive random access channel transmission, measuring the forward channel immediately without a time delay will be efficient for an initial measurement time.

Through step 620, the remote node examines whether a receiving time of the forward channel is reached by comparing the next measurement time to a present time. If the measurement time is not yet reached, the remote node performs step 630 to stop the operation of the receiver and stand by for a predetermined time until the next measurement time is reached. Through this standby process, power consumption may be reduced.

On the contrary, as a result of the examination through step 620, when the next measurement time is reached, the remote node performs step 640 to measure the forward channel after operating the receiver. The measured forward channel may be used to estimate a state of a reverse channel.

In step 650, the remote node compares a channel state estimate calculated from the measured result through step 640 to the preset threshold (representing the channel condition). If the channel state satisfies the preset channel condition (that is, the channel state estimate is greater than the threshold), the remote node performs step 660 to transmit a reverse channel including an access probe.

On the contrary, if the channel state does not satisfy the preset channel condition, the remote node reverts to step 610 and repeats a series of the steps. In this instance, the remote node may reset the next measurement time and the threshold.

The embodiments of the present invention proposed through FIGS. 5 and 6 above employed a method that intermittently performs a channel state measurement of the forward channel for only a certain time and does not operate the remote node receiver for the rest of the period to optimize power consumption of the remote node applying the channel adaptive random access channel. Also, in the embodiments of the present invention, a measurement cycle of the channel state of the forward channel (or the time interval between measurement periods) may be arbitrarily determined by the remote node as a function of the Doppler frequency of the forward channel, the maximum time allowed for transmission, the elapsed time from the time of occurrence of the event for reverse channel transmission, and the QoS.

Further, in the embodiments of the present invention, a host node may transmit the information of the measurement cycle of the forward channel to the remote node after determining the measurement cycle. For this, a parameter related to the random access channel (various parameters for determining the measurement cycle of the forward channel) may be notified via a broadcast channel transmitted in a forward direction. Also, the QoS level may be designated for each remote node based on a QoS at the time of service negotiation for each user.

Figures 7, 8A:
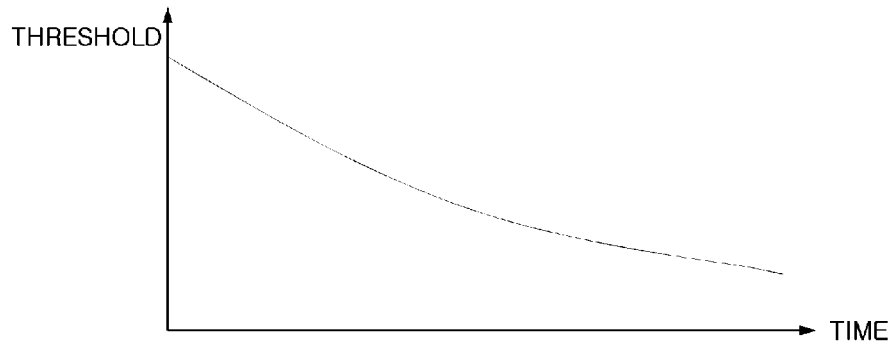
FIG. 7 is a diagram illustrating an example of a message for a host node to transmit information about a channel state measurement cycle of a forward channel to a remote node.
FIGS. 8a and 8b are diagrams illustrating methods of changing a transmission condition in channel transmission of a remote node according to another exemplary embodiment of the present invention.

FIG. 7 is a diagram illustrating an example of a message for the host node to transmit information about the measurement frequency of the forward channel state to the remote node, and the message includes various parameter items and their values. The message of FIG. 7 is under the assumption that a parameter related to a random access channel is transmitted through a broadcast channel being transmitted via a forward channel, and is used when the host node transmits a threshold value of a channel for channel adaptive random access channel transmission.

The parameters illustrated in FIG. 7 are essential parameters for a channel adaptive random access channel, and assuming a channel condition that an average channel gain of a channel is normalized to 1, and a random access channel is transmitted only when the normalized channel gain is greater than or equal to 0.1. In addition to this parameter, an equivalent effect may be produced by various methods including an average transmission probability (implying a probability that the channel gain is greater than or equal to the particular threshold value).

Besides this transmission condition of the random access channel, the host node transmits various parameters for the measurement condition of the forward channel to the remote node. One of them is a minimum cycle in which the remote node is required to perform a forward channel measurement. In FIG. 7, it is designated that the remote node is required to measure the channel state of the forward channel at least 20 times in 1 second. Also, FIG. 7 shows that a measurement frequency of the forward channel may differ based on the Doppler frequency of the channel and QoS (may be used as a parameter representing a quality of a service with a time delay).

As described in the foregoing, a method of notifying, by the host node, a minimum measurement frequency to the terminal was used in the embodiment of FIG. 7. However, in many cases, because the minimum measurement frequency is determined by a Doppler frequency of a channel, a method in which a host node notifies a Doppler frequency of a channel or an estimated value of a minimum Doppler frequency, and a remote node determines a measurement frequency or a minimum measurement frequency based on the determined result, may be also used.

Meanwhile, the embodiments of the present invention additionally propose a method that improves the overall performance by changing the transmission condition during transmission of a channel adaptive random access channel. There may be many reasons of changing the transmission condition during transmission of the random access channel. In this instance, it is preferred to change the transmission condition to increase the transmission probability of the access probe over time after initial transmission of the random access channel.

For example, assume that a total time T to transmit the random access channel is given. Because sufficient time is left at an initial stage in which transmission of the random access channel started, the transmission condition may be set to have a low transmission probability by enabling standby until a good channel state appears. Lowering the transmission probability implies that the forward channel (including the access probe) is transmitted only when the channel is in a relatively good state, and also implies an increase of the threshold value in the channel gain. Therefore, only when the channel gain of the forward channel (or the channel state estimated value of the reverse channel) exceeds the high threshold, the random access probe is transmitted.

However, even when the left time allowed to transmit the random access probe is small after time has passed, if a low transmission probability is maintained (implying that the channel threshold is maintained at a high level), there is a high possibility that transmission of the access probe within the total allowed time will fail. Accordingly, an optimum performance can be achieved by resetting the channel threshold to a lower value (implying changing the transmission probability of the access probe to a high level) when the allowed left time is insufficient after time has passed. In sum, in the channel transmission of the remote node, the embodiments of the present invention may variably reset the transmission channel condition over time. Also, this transmission channel condition is preferably changed and set such that the transmission probability of the reverse channel becomes relatively higher over time.

Similar to the method of setting the receiving cycle of the forward channel described previously, the threshold representing the transmission condition may be also set adaptively based on at least one of a Doppler frequency of the received forward channel, a time allowed to transmit the reverse channel, an elapsed time from the time of occurrence of an event that aims to transmit the reverse channel, or a required level of a set QoS, and a request from the host. This originates from an essential attribute that both (the method of varying the measurement frequency of the forward channel and the method of varying the channel condition) should be managed differently based on the channel state.

Figure 8B:
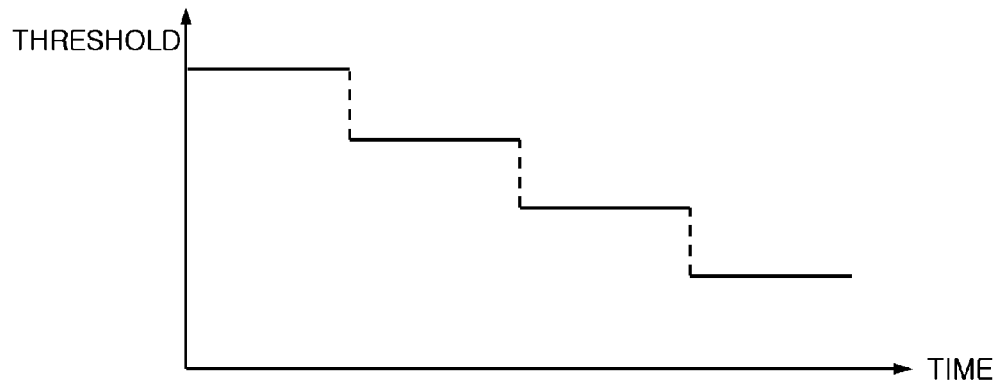

FIGS. 8a and 8b are diagrams illustrating methods of changing the transmission condition in the channel transmission of the remote node according to another exemplary embodiment of the present invention, and shows a change in the threshold of the channel gain representing the channel condition over time. Here, the channel gain may be a value obtained by dividing an instantaneous channel gain of the forward channel by an average channel gain of the forward channel. Since it is well known that a channel state of a reverse channel can be estimated from a channel state of a forward channel in a time division duplex-based wireless communication system, it is obvious that this may be represented by a channel gain or channel state of a reverse channel. Under this environment, the remote node transmits the access probe when the measurement value of the forward channel gain is greater than or equal to the set threshold, and otherwise, delays the transmission of the access probe.

In FIGS. 8a and 8b, determination is made on whether to transmit the random access channel by setting the threshold value to be high at an initial stage in which the remote node started transmission. However, it can be seen that the threshold value of the channel gain changes to a low level over time. That is, operation may be implemented to increase a transmission probability of the access probe by reducing the transmission threshold over time. The embodiment of FIG. 8a illustrates a case in which the threshold representing the transmission condition is obtained as a form of a continuous function based on time, in case the receiver of the remote node always operates. The embodiment of FIG. 8b illustrates an embodiment of a case in which the set threshold changes suddenly at a particular point in time. That is, the threshold value changes at several preset points in time. Actually, in case a state of the forward channel is measured at only certain several time periods, the threshold will be changed at only certain several points in time at which measurement is performed, as shown in the embodiment of FIG. 8b.

Hereinabove, the embodiments of FIGS. 8a and 8b illustrated an embodiment of a case in which the transmission threshold is reduced to optimize a left time allowed for transmission because the left time allowed for transmission reduces over time. However, it is obvious that during transmission of the random access channel, the transmission condition or transmission threshold may be changed more strictly based on a QoS change, a change in the Doppler frequency of the channel, or an instruction by the host node.

Figure 9:
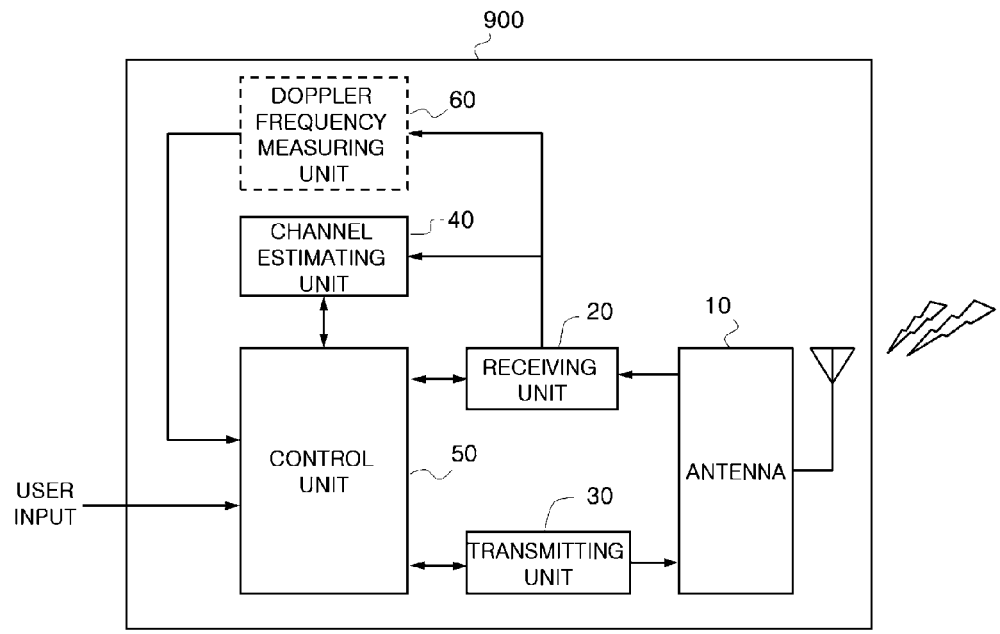
FIG. 9 is a block diagram illustrating a remote node communicating with a host node according to still another exemplary embodiment of the present invention.

FIG. 9 is a block diagram illustrating a remote node 900 communicating with a host node according to still another exemplary embodiment of the present invention, and the remote node 900 includes an antenna 10, a receiving unit 20, a transmitting unit 30, a channel estimating unit 40, and a control unit 50. Also, the remote node 900 may optionally include a Doppler frequency measuring unit 60 according to necessity. Each component of the remote node 900 of FIG. 9 corresponds to a series of channel transmission methods described previously through FIGS. 5 and 6, and thus, to avoid unnecessary overlapping, a brief description is provided herein while focusing on the characteristics of the device.

The antenna 10 serves to receive a signal transmitted through a wireless channel and to send a signal that the remote node 900 intends to transmit.

The receiving unit 20 intermittently receives a forward channel transmitted from a host node (not shown). In this instance, the receiving unit 20 measures a forward channel by operating for only a first period and does not measure a forward channel by failing to operate for a second period apart from the first period. Accordingly, it is preferred to maintain minimum power consumption for the second period during which the receiving unit 20 does not operate. The first period and the second period are arranged repetitively in the flow of time, and a time interval between the plurality of first periods (that is, representing a measurement cycle of the forward channel) may be variably set.

In the viewpoint of implementation, the receiving unit 20 may include a radio frequency (RF) receiving block, a demodulation block, a channel decoding block, and the like, to recover data from the signal received from the antenna 10. The RF receiving block may include a filter and an RF pre-processor, the demodulation block may include a fast Fourier transform (FFT) operator to extract data carried on each subcarrier in case a wireless communication system uses an OFDM scheme, and the channel decoding block may include a demodulator, a deinterleaver, and a channel decoder.

The channel estimating unit 40 estimates a state of a reverse channel from the remote node to the host node based on the forward channel received through the receiving unit 20. For example, the channel estimating unit 40 may estimate a receiving power of the received signal using a pilot of a forward signal.

Meanwhile, the Doppler frequency measuring unit 60 may be optionally included according to necessity. The Doppler frequency measuring unit 60 estimates a Doppler frequency between the host node (not shown) and the remote node 900 using the signal received from the receiving unit 20. That is, the Doppler frequency measuring unit 60 provides the control unit 50 with a basis for determination by estimating the Doppler frequency based on a change in the signal received through the forward channel.

The control unit 50 determines whether the state of the reverse channel estimated through the channel estimating unit 40 satisfies a preset channel condition, and determines whether to transmit the reverse channel based on the determined result. For this, the control unit 50 determines whether to transmit the reverse channel by comparing a state estimate of the reverse channel calculated based on a channel gain of the received forward channel to a threshold representing the channel condition. In this instance, it is preferred to reset the channel condition variably over time. Meanwhile, the control unit 50 may set the threshold in consideration of a QoS of a service required by a user, and may set the threshold using the Doppler frequency measured by the Doppler frequency measuring unit 60.

Also, the control unit 50 controls the receiving unit 20 by determining an operating cycle of the receiving unit 20 based on a determining parameter. Here, the determining parameter may be at least one of a Doppler frequency of the received forward channel, a time allowed to transmit the reverse channel, an elapsed time from the time of occurrence of an event that aims to transmit the reverse channel, or a required level of a set QoS, and a request from the host (not shown). Accordingly, the determining parameter may be received from the host node (not shown) or inputted by the user from the outside of the remote node 900, or the control unit 50 alone may calculate the determining parameter based on the forward channel received through the receiving unit 20 and at least one preset constraint condition.

The transmitting unit 30 transmits the reverse channel adaptively based on the determination of the control unit 50. For this, the transmitting unit 30 generates a signal to be transmitted to a base station through a random access channel by the control of the control unit 50. That is, the transmitting unit 30 converts a signal to be transmitted to a base station via a random access channel into a form dedicated to transmit through a radio resource and provides it to the antenna 10, only when the control unit 50 allows the transmitting unit 30 to perform a random access channel transmission.

In the viewpoint of implementation, the transmitting unit 30 may include a signal generating block, a channel coding block, a modulation block, and a RF transmitting block. The channel coding block may include a modulator, an interleaver, and a channel encoder, the modulation block may include an inverse fast Fourier transform (IFFT) operator to map data to each subcarrier in case a wireless communication system uses an OFDM scheme, and the RF transmitting block may include a filter and a RF pre-processor.

Meanwhile, the method of the present disclosure may be embodied as computer-readable code in computer-readable recording media. In this instance, the computer-readable recording media includes all types of recording devices for storing data that can be read by a computer system. The computer-readable recording media includes, for example, read-only memory (ROM), random access memory (RAM), CD ROM disks, magnetic tape, floppy disks, optical media storage devices, and the like, and may include implementation in a form of a carrier wave (for example, transmission via an Internet). Also, the computer-readable recording media can be distributed over network-coupled computer systems so that the computer-readable code is stored and executed in a distributed fashion. Also, a functional program, code and code segments for implementing the present disclosure can be easily inferred by computer programmers skilled in the technical field to which the present disclosure belongs.

Hereinabove, the present disclosure has been described with reference to various exemplary embodiments thereof. It will be understood by those skilled in the art that the present disclosure may be implemented in modified form without departing from the essential features of the present disclosure. The exemplary embodiments should be considered in descriptive sense only and not for purposes of limitation. Therefore, the scope of the present disclosure is defined not by the detailed description of the invention but by the appended claims, and all differences within the equivalent scope thereto will be construed as being included in the present disclosure.

INDUSTRIAL APPLICABILITY

According to the embodiments of the present invention described in the foregoing, efficiency of channel transmission may be improved by enabling a remote node to transmit a reverse channel with a delay in consideration of a channel state rather than making a response immediately upon receiving a forward channel from a host node, and unnecessary power required for channel reception may be reduced by intermittently measuring the forward channel being received from the host node. Through this, when a battery is used in a mobile communication terminal or the like, an operating time of the terminal may be greatly improved.

Also, according to the embodiments of the present invention described in the foregoing, performance of reverse channel transmission may be optimized by variably setting a channel condition in consideration of a change in the channel state. That is, a transmission power of the host node in the same performance may be reduced, while increasing a detection probability of the host node for the same transmission output. This allows channel adaptive random access channel transmission with higher efficiency and lower power consumption.

The invention claimed is:

1. A method for channel transmission of a remote node, the method comprising:
    intermittently receiving a forward channel transmitted from a host node,
    wherein the receiving of the forward channel comprises, measuring a state of the forward channel for a first period by enabling an operation of a receiver of the remote note for the first period, and failing to measure the state of the forward channel for a second period by disabling the operation of the receiver for the second period,
    wherein the first period and the second period are arranged repetitively in a flow of time and a measurement cycle of the state of the forward channel is adjusted based on the received forward channel;
    estimating a state of a reverse channel from the remote node to the host node based on the received forward channel;
    determining whether the estimated state of the reverse channel satisfies a preset channel condition; and
    adaptively transmitting the reverse channel based on the determined result.

2. The method according to claim 1, wherein the failing to measure the state of the forward channel for the second period further comprises powering off a majority of blocks of the remote node for the second period.

3. The method according to claim 1, wherein a time interval between the plurality of first periods arranged repetitively is variably set based on at least one of a Doppler frequency of the received forward channel, a time allowed to transmit the reverse channel, an elapsed time from the time of occurrence of an event that aims to transmit the reverse channel, a required level of a set quality of service (QoS), or a request from the host.

4. The method according to claim 3, wherein the measurement cycle of the state of the forward channel is set based on at least one of in inverse proportion to the Doppler frequency of the received forward channel, in proportion to the time allowed to transmit the reverse channel, in inverse proportion to the time of occurrence of the event that aims to transmit the reverse channel, in inverse proportion to the required level of the set quality of service (QoS).

5. The method according to claim 1, wherein the receiving of the forward channel comprises:
    setting a next measurement time;
    comparing the set next measurement time to a present time;
    measuring the state of the forward channel by enabling the operation of the receiver, when the next measurement time corresponds to the present time; and
    stopping, by the remote node, the operation of the receiver and standing by for a predetermined time, when the next measurement time does not correspond to the present time,
    wherein the comparing repeats after the standby for the predetermined time.

6. The method according to claim 1, wherein a transmission power for transmitting the reverse channel is determined by estimating the state of the reverse channel through measurement of a pilot channel included in the transmitted forward channel.

7. The method according to claim 1, wherein the reverse channel is a random access channel (RACH), and the remote node is a wireless communication terminal in conformity with a time division duplex (TDD) scheme.

8. A method for channel transmission of a remote node, the method comprising:
receiving a forward channel transmitted from a host node, wherein the receiving of the forward channel comprises,
measuring a state of the forward channel for a first period by enabling an operation of a receiver of the remote note for the first period, and failing to measure the state of the forward channel for a second period by disabling the operation of the receiver for the second period,
wherein the first period and the second period are arranged repetitively in a flow of time and a measurement cycle of the state of the forward channel is adjusted based on the received forward channel;
estimating a state of a reverse channel from the remote node to the host node based on the received forward channel;
determining whether the estimated state of the reverse channel satisfies a preset channel condition; and
adaptively transmitting the reverse channel based on the determined result,
wherein the channel condition is variably reset over time.

9. The method according to claim 8, wherein the channel condition is changed and set such that a transmission probability of the reverse channel becomes relatively higher over time.

10. The method according to claim 8, wherein a threshold representing the channel condition is variably set based on at least one of a Doppler frequency of the received forward channel, a time allowed to transmit the reverse channel, an elapsed time from the time of occurrence of an event that aims to transmit the reverse channel, a required level of a set quality of service (QoS), or a request from the host.

11. A remote node, comprising:
a receiving unit to intermittently receive a forward channel transmitted from a host node,
wherein the receiving unit measures a state of the forward channel by enabling an operation of the receiving unit for only a first period and does not measure the state of the forward channel by disabling the operation of the receiving unit for a second period,
wherein the first period and the second period are arranged repetitively in a flow of time and a measurement cycle of the state of the forward channel is adjusted based on the received forward channel;
a channel estimating unit to estimate a state of a reverse channel from the remote node to the host node based on the received forward channel;
a control unit to determine whether the estimated state of the reverse channel satisfies a preset channel condition and determine whether to transmit the reverse channel based on the determined result; and
a transmitting unit to adaptively transmit the reverse channel based on the determination of the control unit.

12. The remote node according to claim 11, wherein a minimum measurement frequency of the state of the forward channel is determined based on a Doppler frequency of the forward channel.

13. The remote node according to claim 11, wherein a time interval between the plurality of first periods arranged repetitively is variably set based on at least one of a Doppler frequency of the received forward channel, a time allowed to transmit the reverse channel, an elapsed time from the time of occurrence of an event that aims to transmit the reverse channel, a required level of a set quality of service (QoS), or a request from the host.

14. The remote node according to claim 12, wherein minimum power consumption is maintained for the second period during which the receiving unit fails to operate.

15. The remote node according to claim 11, wherein the control unit controls the receiving unit by determining an operating cycle of the receiving unit based on a determining parameter, and the determining parameter is at least one of a Doppler frequency of the received forward channel, a time allowed to transmit the reverse channel, an elapsed time from the time of occurrence of an event that aims to transmit the reverse channel, a required level of a set quality of service (QoS), or a request from the host.

16. The remote node according to claim 15, wherein the determining parameter is received from the host or inputted by a user from an outside of the remote node.

17. The remote node according to claim 15, wherein the determining parameter is calculated by the control unit based on the received forward channel and at least one preset constraint condition.

18. The remote node according to claim 11, wherein the channel condition is variably reset over time.

19. The remote node according to claim 11, wherein the control unit determines whether to transmit the reverse channel by comparing a state estimate of the reverse channel calculated based on a channel gain of the received forward channel to a threshold representing the channel condition.

20. The remote node according to claim 11, wherein a threshold representing the channel condition is variably set based on at least one of a Doppler frequency of the received forward channel, a time allowed to transmit the reverse channel, an elapsed time from the time of occurrence of an event that aims to transmit the reverse channel, a required level of a set quality of service (QoS), or a request from the host.

* * * * *